US009706700B2

(12) United States Patent
Lammerant et al.

(10) Patent No.: US 9,706,700 B2
(45) Date of Patent: Jul. 18, 2017

(54) AGRICULTURAL BALER HAVING A QUARTER TURN WITH A SPRING LOADED LOCK ARRANGEMENT

(71) Applicant: CNH Industrial America LLC, New Holland, PA (US)

(72) Inventors: Eddy Lammerant, Koksijde (BE); Kurt Zwaenepoel, De Haan (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/097,068

(22) Filed: Apr. 12, 2016

(65) Prior Publication Data
US 2016/0316612 A1    Nov. 3, 2016

(30) Foreign Application Priority Data

Apr. 28, 2015  (BE) .................................. 2015/5278

(51) Int. Cl.
*A01F 15/08*        (2006.01)
*A01B 73/04*        (2006.01)
(Continued)

(52) U.S. Cl.
CPC ............ *A01B 73/04* (2013.01); *A01F 15/071* (2013.01); *A01F 15/0883* (2013.01); *A01F 2015/074* (2013.01); *F16B 1/04* (2013.01)

(58) Field of Classification Search
CPC .. A01F 15/0883; A01F 15/0875; A01F 15/08; A01D 2085/007; Y10T 403/32254;
(Continued)

(56) References Cited

U.S. PATENT DOCUMENTS 4,162,135 A     7/1979  Seymour
4,258,540 A  *  3/1981  Munro .................... A01F 15/08
                                                100/189
(Continued)

FOREIGN PATENT DOCUMENTS

BE    GB 2343924 A  *  5/2000  ............. A01B 73/00
EP       0543145 A2      5/1993
(Continued)

OTHER PUBLICATIONS

EP16167405, Extended European Search Report, mailed Sep. 26, 2016, 5 pages.

*Primary Examiner* — Jonathan Masinick
(74) *Attorney, Agent, or Firm* — Peter K. Zacharias; Patrick M. Sheldrake

(57) ABSTRACT

An agricultural baler including a frame and a quarter turn attached to the frame. The agricultural baler further includes a transport lock associated with a lateral end of the quarter turn for locking the quarter turn in a transport position. The transport lock includes a lock plate with a first hole receiving a first fastener at one pivot location, a second hole receiving a second fastener attached to and extending from a respective lateral end or the frame, and a third hole for receiving a latch pin extending from another of the respective lateral end or the frame. The transport lock further includes a biasing arrangement for biasing the third hole in the lock plate toward the latch pin when the latch pin is positioned within the third hole.

12 Claims, 5 Drawing Sheets

(51) Int. Cl.
*A01F 15/07* (2006.01)
*F16B 1/04* (2006.01)

(58) Field of Classification Search
CPC ..... Y10T 403/32262; Y10T 403/32426; Y10T 403/32393; F16B 1/02; F16B 1/04
See application file for complete search history.

(56) References Cited

U.S. PATENT DOCUMENTS

| | | | |
|---|---|---|---|
| 4,389,929 A * | 6/1983 | Kluver | ................ A01F 15/0883 100/88 |
| 6,240,712 B1 | 6/2001 | Meijer | |
| 6,732,774 B1 * | 5/2004 | Seckel | ................... A01F 15/04 100/192 |
| 7,353,753 B2 | 4/2008 | Viaud | |
| 2007/0209530 A1 | 9/2007 | Viaud | |

FOREIGN PATENT DOCUMENTS

| | | |
|---|---|---|
| EP | 1502497 A1 | 2/2005 |
| EP | 2606714 A1 | 6/2013 |
| JP | 3801618 B1 | 7/2006 |
| JP | 2009291082 A | 12/2009 |

* cited by examiner

AGRICULTURAL BALER HAVING A QUARTER TURN WITH A SPRING LOADED LOCK ARRANGEMENT

CROSS REFERENCE TO RELATED APPLICATION

This application claims priority to Belgium Application BE2015/5278, filed Apr. 28, 2015, the contents of which are incorporated herein by reference.

FIELD OF THE INVENTION

The present invention relates to agricultural balers and, more particularly, to a quarter turn unit that is used on the back of a round baler.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a round baler or large square baler, straddles the windrows and travels along the windrows to pick up the crop material and form it into bales.

A round baler may include a main bale chamber where the crop material is rolled into a bale of a predetermined size, and then typically wrapped with twine or mesh. An optional film wrapping station may be positioned at the rear of the baler, and receives the formed bale and wraps the bale with a stretchable plastic film to seal the bale against exposure to the ambient environment and assist with the anaerobic fermentation process. A further optional quarter turn unit (also known as a side tip unit) can be positioned rearward from the film wrapping station. The quarter turn functions to tip the round bale on one end as it is ejected from the baler, so that the bale does not roll down a hill. The quarter turn basically has a frame member that supports one end of the bale and the other end is allowed to fall to the ground. In one configuration, the frame member can be a simple pipe which extends horizontally rearward when in the field or harvest position. To avoid a possible collision between the quarter turn and a vehicle traveling behind the baler, the quarter turn can be manually pivoted to an upright position and locked in place during road transport using a bolt and lock nut arrangement. The pipe and supporting structure can be somewhat heavy and awkward to rotate and hold in place while the bolt and lock nut arrangement is installed.

What is needed in the art is an agricultural baler with a quarter turn which can be easily rotated between the field and road transport positions, and easily locked and unlocked in the transport position.

SUMMARY OF THE INVENTION

In accordance with an aspect of the present invention, there is provided a quarter turn for a baler with a spring loaded lock arrangement which allows an operator to pivot the quarter turn to the transport position, and lock the quarter turn in place at the transport position, without the use of tools.

In accordance with another aspect of the present invention, there is provided an agricultural baler including a frame defining a rear of the baler, and a quarter turn attached to the frame at the rear of the baler. The quarter turn includes opposite lateral ends and a pair of end plates respectively positioned at each lateral end. Each end plate is pivotally attached to the frame at a pivot location, and the quarter turn is pivotably movable between a field position and a transport position. The baler further includes a transport lock associated with one of the lateral ends for locking the quarter turn in the transport position. The transport lock includes a lock plate with a first hole receiving a first fastener at one pivot location, a second hole receiving a second fastener attached to and extending from one of a respective end plate or the frame, and a third hole for receiving a latch pin extending from another of the respective end plate or the frame. The transport lock further includes a biasing arrangement for biasing the third hole in the plate toward the latch pin when the latch pin is positioned within the third hole.

An advantage is that the quarter turn can be easily pivoted between the field and transport positions, and vice versa, and locked into the transport position without the use of tools.

Another advantage is that the quarter turn can be easily locked into the transport position with a snap fit arrangement.

Yet another advantage is that the quarter turn has a lock plate which is configured to automatically ride over the top of the latch pin as the quarter turn is pivoted to the transport position.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout. In the drawings.

DETAILED DESCRIPTION OF THE INVENTION

Figure 1:
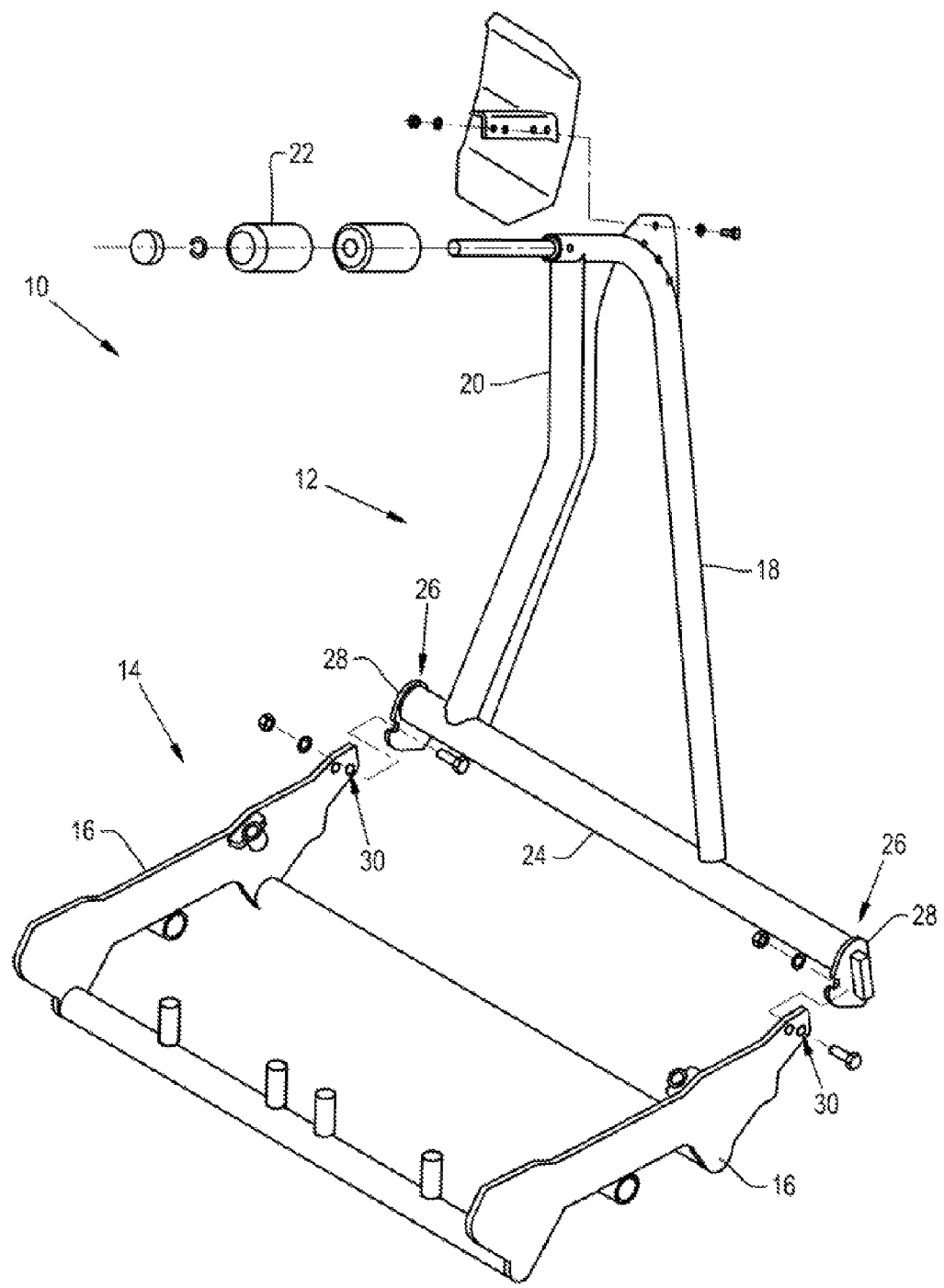
FIG. 1 is a perspective view of a quarter turn which can be mounted to a rear of a film wrapper on a round baler, in accordance with an exemplary embodiment of the present invention.
Figure 2:
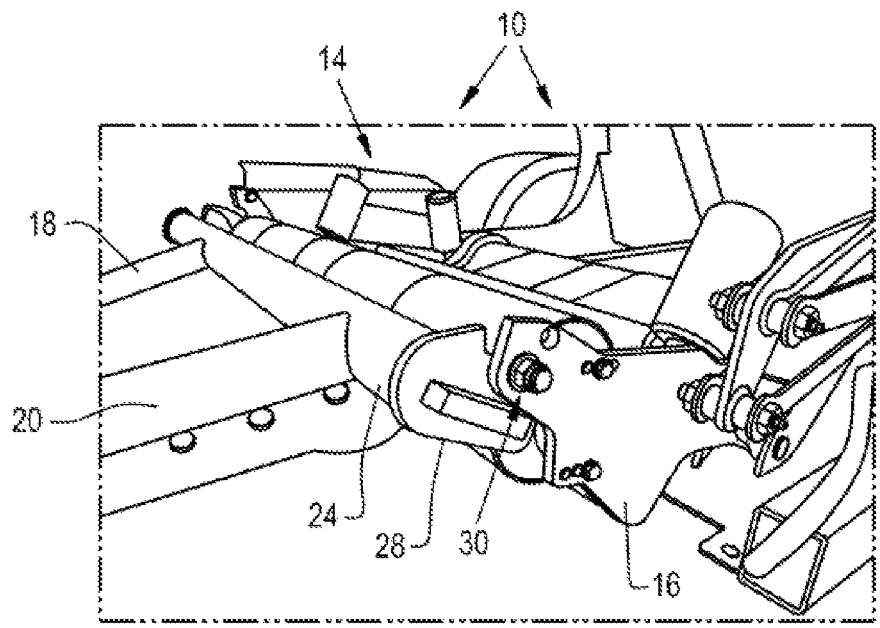
FIG. 2 is a perspective end view of the quarter turn shown in FIG. 1, with the quarter turn in a field or harvest position, in accordance with an exemplary embodiment of the present invention.
Figure 3:
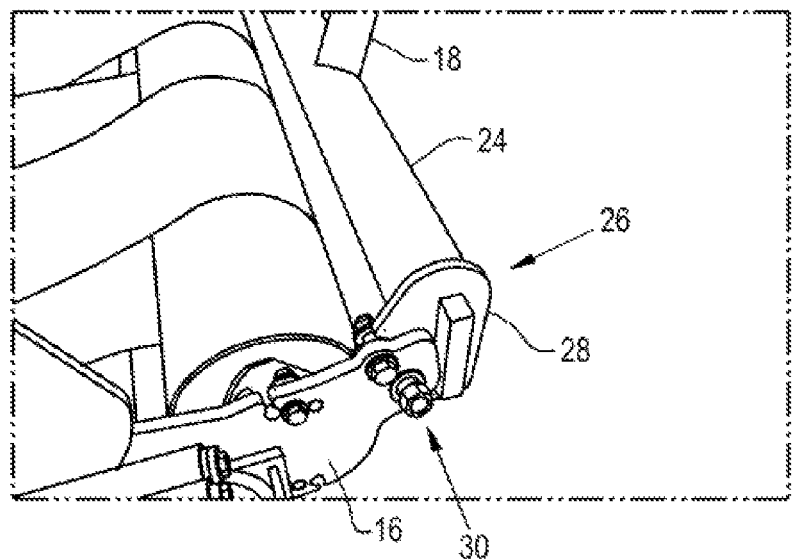
FIG. 3 is an opposite perspective end view of the quarter turn shown in FIGS. 1 and 2, with the quarter turn in a road transport position, in accordance with an exemplary embodiment of the present invention.

Referring now to the drawings, and more particularly to FIGS. 1-3, there is shown a perspective view of a portion of a round baler 10, including a quarter turn 12 which can be mounted to a film wrapper 14 at a rear of the round baler 10, in accordance with an exemplary embodiment of the present invention. Only a portion of a frame 16 of the film wrapper 14 is shown for simplicity sake. The film wrapper 14 functions to rotate and wrap a bale with a stretchable plastic film (i.e., basically shrink wrapping the bale) to seal the bale from the ambient environment and assist with anaerobic fermentation within the bale.

The quarter turn 12 is mounted to a rear of the frame 16, and generally functions to rotate the bale one quarter turn when discharged from the baler 10, thus tipping the round bale on one end in the field. In simple terms, the quarter turn 12 has at least one arm which extends rearwardly from the baler 10 and supports one end of the bale as it is ejected rearwardly from the film wrapper 14. This allows the other end of the bale to fall downwardly, thus tipping the bale on one end. In the embodiment shown, the quarter turn 12 includes a pair of rearwardly extending arms 18 and 20 which form a generally triangular configuration, with the arm 18 having a distal end which is curved upward to prevent the bale from rolling off to the rear, and the arm 20 having a distal end which is attached near the top of the arm 18, thus, providing the tipping action. A roller 22 or the like can be affixed to the upper end of the arm 18 to assist the bale when falling from the quarter turn 12 to the ground.

A transverse member 24 defines opposite lateral ends 26 of the quarter turn 12. The arms 18 and 20 extend rearwardly from the transverse member 24 when the quarter turn 12 is in a field position (illustrated in FIG. 2), and extend upwardly from the transverse member 24 when the quarter turn 12 is in a transport position (illustrated in FIGS. 1 and 3). A pair of end plates 28 are respectively positioned at each lateral end 26 of the transverse member 24. Each end plate 28 is pivotally attached to the frame 16 at a pivot location 30.

Figure 4:
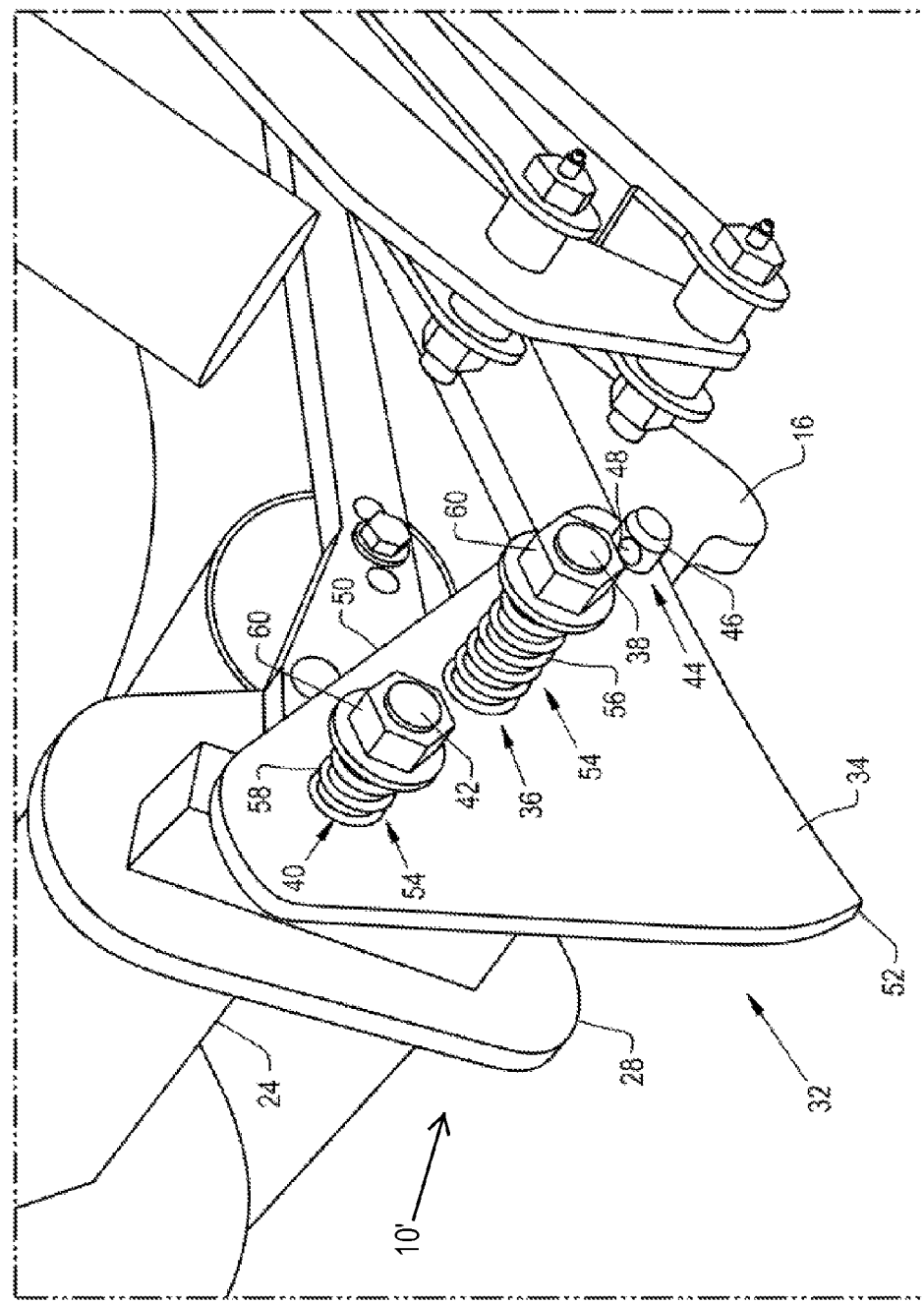
FIG. 4 is a perspective view of an embodiment of a transport lock comprising a locking plate, the transport lock configured to be used on the quarter turn shown in FIGS. 1-3, in accordance with an exemplary embodiment of the present invention.
Figure 5:
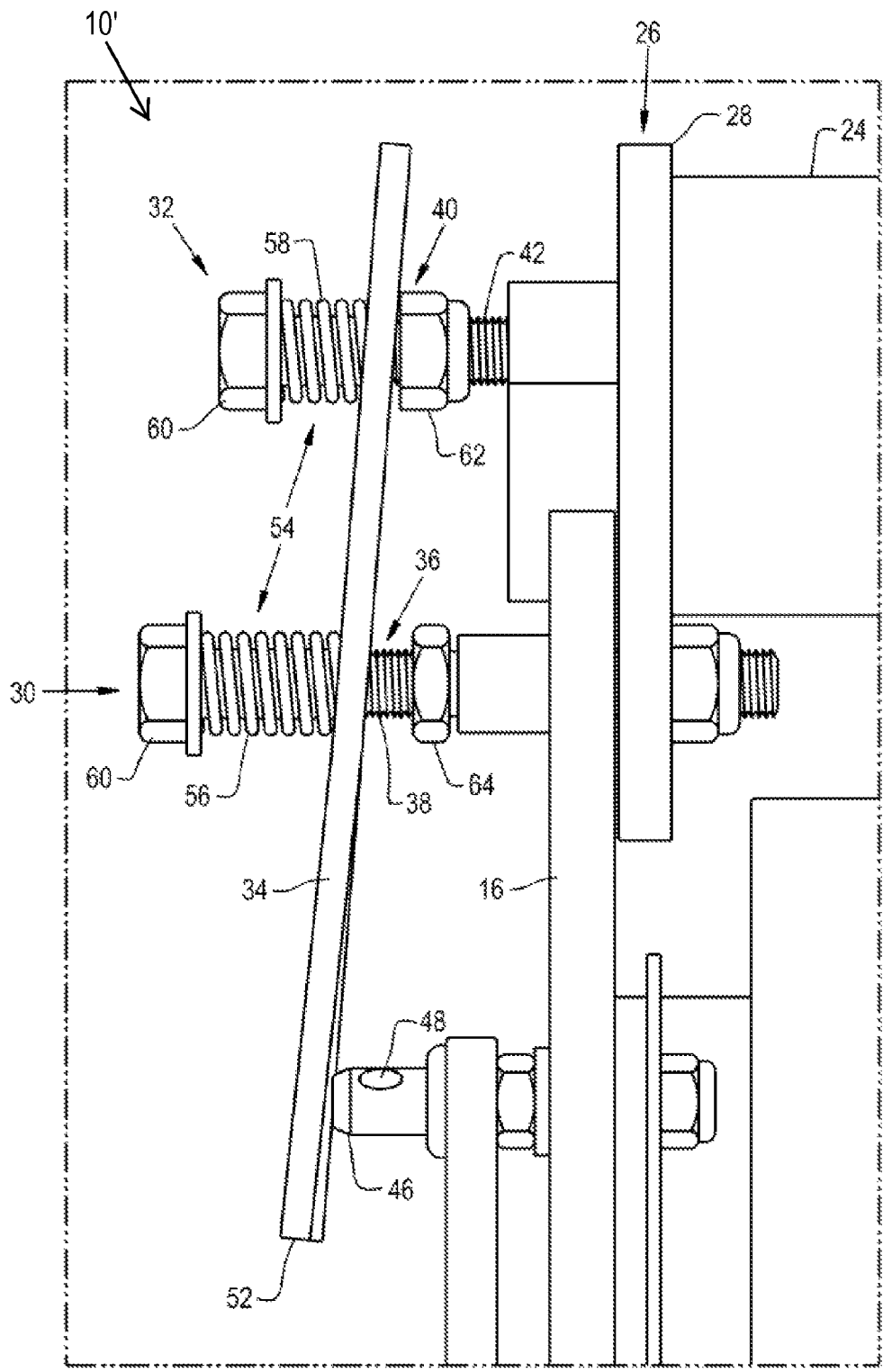
FIG. 5 is a top view of the transport lock shown in FIG. 4, with the locking plate in a disengaged or unlocked position, in accordance with an exemplary embodiment of the present invention.
Figure 6:
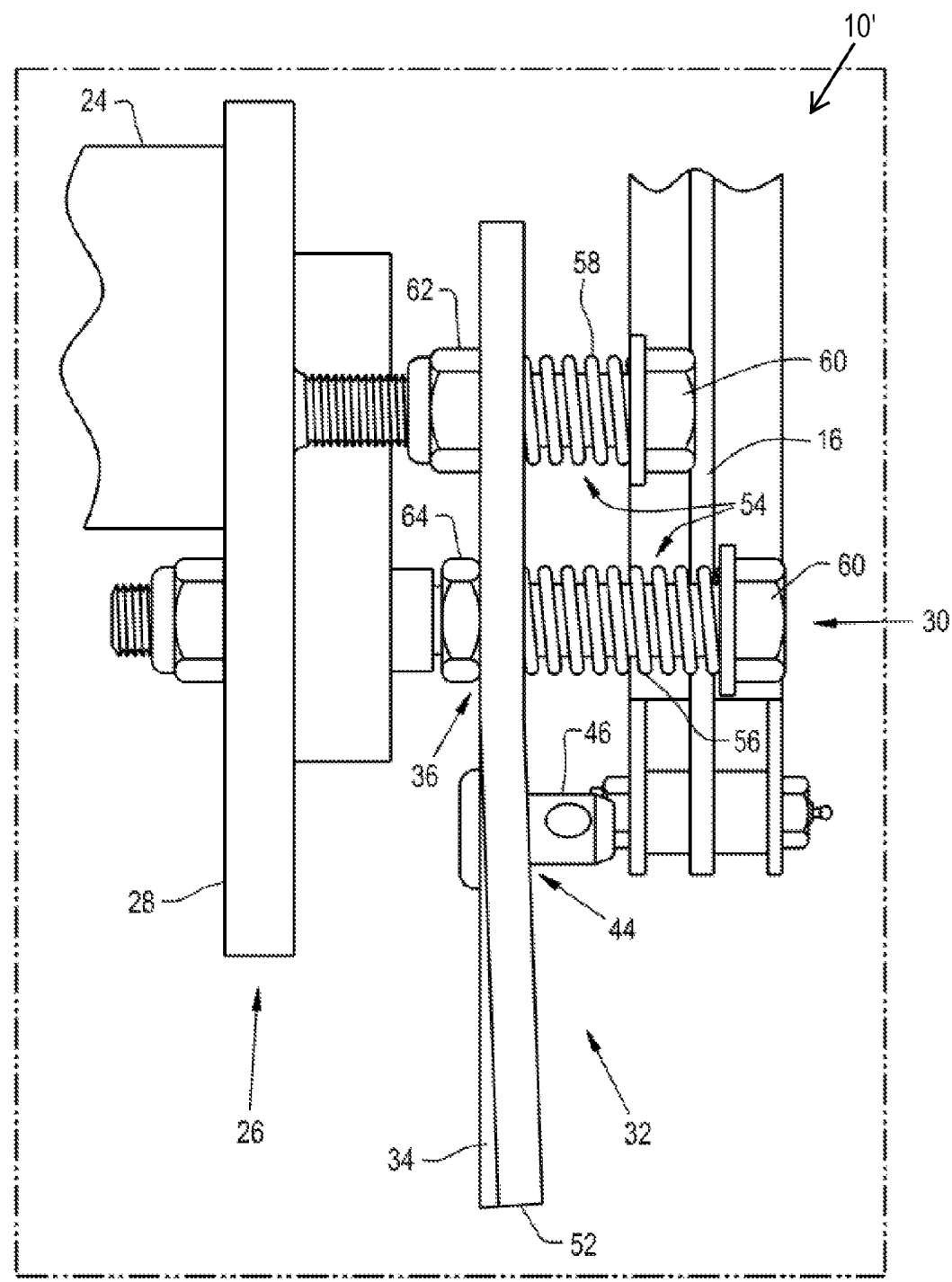
FIG. 6 is a rear view of the transport lock shown in FIGS. 3 and 4, with the locking plate in an engaged or locked position, in accordance with an exemplary embodiment of the present invention.

According to an aspect of the present invention, a transport lock is associated with one of the lateral ends 26 for locking the quarter turn 12 in the transport position. Referring now to FIGS. 4-6, there is illustrated an exemplary alternative embodiment of the baler 10, which exemplary alternative embodiment is generally designated as 10', in accordance with an exemplary embodiment of the present invention. The baler 10' comprises a transport lock 32 which includes a lock plate 34 with a first hole 36 receiving a first fastener 38 at a respective pivot location 30. The lock plate 34 also includes a second hole 40 receiving a second fastener 42 attached to and extending from a respective end plate 28 or the frame 16. The lock plate 34 also includes a third hole 44 for receiving a latch pin 46 extending from an adjacent respective end plate 28 or the frame 16. The lock plate 34 is positioned laterally outward from the frame 16, and the end plate 28 is positioned laterally inward from the frame 16.

In the illustrated embodiment, the second fastener 42 is attached to the end plate 28 and the latch pin 46 is attached to the frame 16. However, this configuration could be reversed such that the second fastener 42 is attached to the frame 16 and the latch pin 46 is attached to the end plate 28. Moreover, the latch pin 46 can include an optional opening 48 for receiving a retainer pin (e.g., spring pin, not illustrated).

The lock plate 34 can be generally triangular shaped, as illustrated, and the first hole 36, second hole 40, and third hole 44 can be arranged along a common edge 50 of the lock plate 34. The triangular shaped lock plate 34 has an apex 52 opposite from the common edge 50. The apex 52 can be bent to allow the lock plate 34 to ride over the latch pin 46 as the quarter turn 12 is pivoted from the field position to the transport position.

A biasing arrangement 54 functions to bias at least a portion of the lock plate 34 associated with the third hole 44 toward the latch pin 46. In the illustrated embodiment, the biasing arrangement 54 can include a first spring 56 positioned around the first fastener 38 and a second spring 58 positioned around the second fastener 42. The first spring 56 and second spring 58 can each be retained on a respective fastener 38 or 42 using lock nuts 60. The first spring 56 and the second spring 58 each engage and bias the lock plate 34 with a desired preload by adjusting the lock nuts 60.

In the embodiment shown, the first spring 56 and the second spring 58 are each configured as compression springs. Further, the first spring 56 and the second spring 58 are each positioned on a laterally outer side of the lock plate 34. However, the biasing arrangement 54 can be configured differently. For example, a strap or the like could straddle between the first and second fasteners 38 and 42, under the lock nuts 60, and a single spring could be positioned between the strap and the lock plate 34.

With reference to FIGS. 5 and 6, the biasing arrangement 54 can also include a pair of threaded nuts 62 and 64 located on the laterally inner side of the lock plate 34. The nut 62 is shown configured as a lock nut, and the nut 64 is shown configured as a standard threaded nut. However, the particular type of nut (lock or standard) may not be important. These two nuts 62 and 64 can be adjusted so that the curved apex 52 rides over the latch pin 46 when the quarter turn 12 is moved to the transport position. The nut 64 can also be used to set where the lock plate 34 seats against the latch pin 46.

With reference to FIGS. 4-6, when an operator desires to configure the baler 10' to a transport mode, it is necessary under certain regulatory requirements to fold the quarter turn 12 to the upright or transport position. The transport lock 32 can be advantageously disengaged from the latch pin 46 without the use of tools. More particularly, the transport lock 32 can be disengaged from the latch pin 46 by manually grasping the lock plate 34 and moving the lock plate 34 away from the latch pin 46, against a biasing force of the biasing arrangement 54.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural baler, comprising:
   a frame defining a rear of the baler;
   a quarter turn attached to the frame at the rear of the baler, the quarter turn comprising opposite lateral ends and a pair of end plates respectively positioned at each lateral end, each of the end plates being pivotally attached to the frame at a respective pivot location, the quarter turn being pivotably movable between a field position and a transport position; and a transport lock associated with one of the lateral ends for locking the quarter turn in the transport position, the transport lock comprising a lock plate having a first hole receiving a first fastener at one of the pivot locations, a second hole receiving a second fastener attached to and extending from one of one of the end plates and the frame, and a third hole for receiving a latch pin extending from another of the one of the end plates and the frame, the transport lock further comprising a biasing arrangement for biasing at least a portion of the lock plate associated with the third hole toward the latch pin.

2. The agricultural baler of claim 1, wherein the lock plate is generally triangular shaped, and the first hole, the second hole, and the third hole are each arranged along a common edge of the lock plate.

3. The agricultural baler of claim 2, wherein the triangular shaped lock plate has an apex opposite from the common edge, wherein the apex is bent to allow the lock plate to ride over the latch pin as the quarter turn is pivoted from the field position to the transport position.

4. The agricultural baler of claim 1, wherein the second fastener is attached to the one of the end plates and the latch pin is attached to the frame.

5. The agricultural baler of claim 4, wherein the latch pin includes an opening for receiving a retainer pin.

6. The agricultural baler of claim 1, wherein the biasing arrangement includes a first spring positioned around the first fastener and a second spring positioned around the second fastener, each of the first spring and the second spring engaging and biasing the lock plate.

7. The agricultural baler of claim 6, wherein each of the first spring and the second spring are compression springs.

8. The agricultural baler of claim 6, wherein each of the first spring and the second spring are positioned on a laterally outer side of the lock plate.

9. The agricultural baler of claim 8, further comprising a first pair of nuts engaging the first fastener and the second fastener on a laterally outer side of the first spring and the second spring, respectively, and a second pair of nuts engaging the first fastener and the second fastener on a laterally inner side of the lock plate.

10. The agricultural baler of claim 1, wherein the one of the end plates is positioned laterally inward from the frame, and the lock plate is positioned laterally outward from the frame.

11. The agricultural baler of claim 1, wherein the transport lock can be disengaged from the latch pin by manually grasping the lock plate and moving the lock plate away from the latch pin, against a biasing force of the biasing arrangement.

12. The agricultural baler of claim 1, wherein the quarter turn further comprises a transverse member defining the opposite lateral ends, and at least one arm extending rearwardly from the transverse member when the quarter turn is in the field position.

* * * * *